(No Model.)

W. C. JEROME.
STICKY FLY PAPER.

No. 552,762. Patented Jan. 7, 1896.

WITNESSES:
A. E. Dieterich
Jas. L. Crawford

INVENTOR
W. C. Jerome.
BY John U. O'Meara
ATTORNEY.

form part of Letters Patent No. 552,762, dated January 7, 1896.

UNITED STATES PATENT OFFICE.

WILLIAM C. JEROME, OF MAYFIELD, NEW YORK, ASSIGNOR TO OTTO G. STOLZ, OF CHICAGO, ILLINOIS.

STICKY FLY-PAPER.

SPECIFICATION forming part of Letters Patent No. 552,762, dated January 7, 1896.

Application filed November 13, 1894. Serial No. 528,670. (No specimens.)

*To all whom it may concern:*

Be it known that I, WILLIAM C. JEROME, residing at Mayfield, in the county of Fulton and State of New York, have invented certain new and useful Improvements in Fly-Paper, of which the following is a full, clear, and exact description.

Sheet fly-paper as generally made has the edges of its sticky face left free from the adhesive substance to provide convenient means for handling the sheet. This provision in practice has been found objectionable, in that the edges being free from the sticky substance soon curl up and form, as it were, a convenient ledge upon which the flies are apt to fly and rest as they are drawn toward the paper. Furthermore, even when such paper lies flat the uncovered edges form a ledge on which the flies can creep toward the sticky surface, from which, as they engage it, they can (owing to the smooth edge) easily disengage themselves and become free. A still further objection to the ordinary fly-paper is that when laid on the inclined surface the sticky substance (when in a warm room) will run onto and over the edges, thereby not only rendering the paper unfit for handling, but also serving to soil the surface on which it is laid.

My invention therefore seeks to provide a fly-paper so constructed as to positively overcome the several objections above noted, and also to produce paper which will serve to catch the flies quicker and in greater numbers than can be caught with the ordinary fly or sticky sheet paper.

A further object is to provide a fly-catching device which can be manufactured as cheaply as the ordinary sheet-paper, which can be easily handled without the danger of soiling one's fingers, from which it will be impossible for the flies to escape after they are once stuck thereon, and from which the sticky substance cannot run over the edges thereof, and which can be shifted about from place to place without bringing the fingers or hand in contact with the sticky surface.

With other minor objects in view the invention consists in the peculiarly constructed and arranged fly paper or catcher hereinafter described in detail and specifically pointed out in the appended claims, reference being had to the accompanying drawings, in which—

Figure 1:
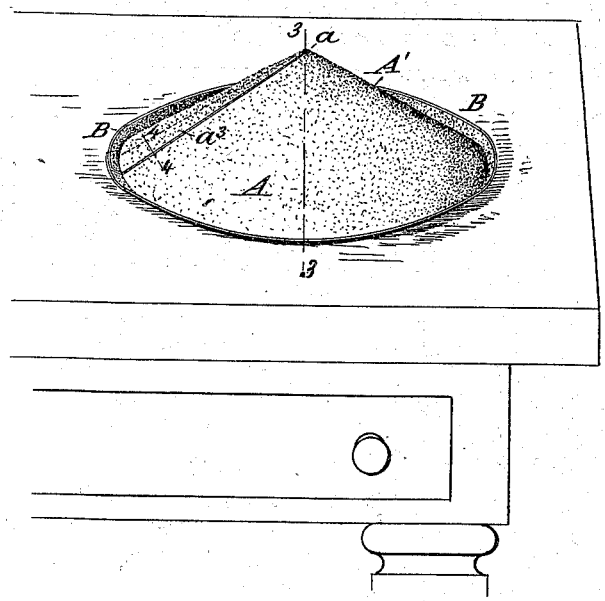
Figure 2:
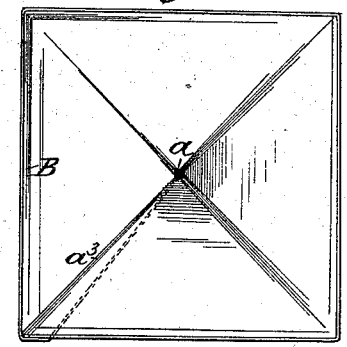
Figure 4:
Figure 3:
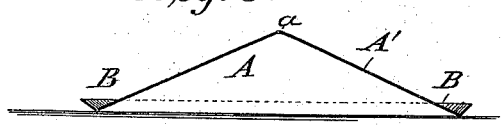
Figure 5:
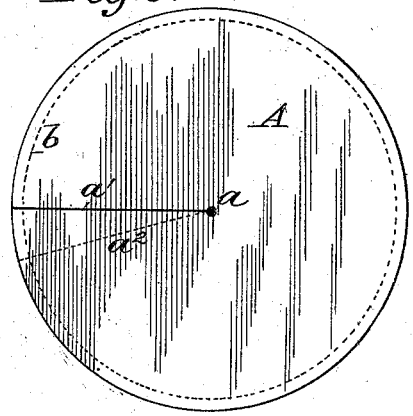

Figure 1 is a perspective view of a fly-catching device constructed in accordance with the invention. Fig. 2 is a plan view of a modified form of the same. Fig. 3 is a transverse section taken on the line 3 3, Fig. 1. Fig. 4 is a similar view of the same, taken on the line 4 4, Fig. 1. Fig. 5 is a view of the blank or sheet before it is folded and bent up to form the catcher proper, and Fig. 6 illustrates the manner in which the sheets are preferably assembled for shipment.

In the practical construction of my improved fly catcher or paper the same is formed of sheet-paper, which, however, is preferably of such a thickness as to be practically rigid when bent up. This sheet may be circular, as shown in Figs. 1 and 3, or it may be square, as shown in Fig. 2, or any other desired shape. The body or sheet A is preferably circular, and has a small central aperture $a$ and a radial cut or slit $a'$, adjacent which is marked on the sheet a folding-line $a^2$, as clearly shown and for a purpose presently made clear, such sheet A having also near its edges lines or indentations $b$, from which the edges are turned up vertically, as shown at B in Figs. 1 and 3, which form surrounding ledges, which serve a double purpose—first, as a means for preventing the flies working off the face of the sheet at the edges, and, second, as a retarding means for preventing the sticky substance running off at the edges in case it should for any reason melt.

The face A' of the sheet is entirely covered with the usual sticky substance, so as to leave no portion of the said face uncovered. It will be noticed by providing upturned vertical edges a convenient means is provided whereby the sheet can be handled, and to further provide for easy manipulation of the paper without the danger of soiling the fingers the complete device is made of cone shape.

Figure 6:
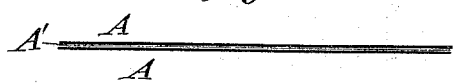

It should be stated that for convenience and economy in shipping the sheet is made flat and cut radially and apertured centrally, as before stated, and such sheets are joined in pairs with their sticky faces joined, as shown in Fig. 6, which sheets are afterward separated, as is usually done with the ordinary fly-paper. After the paper sheets are separated the cut edge $a^3$ is folded over to lap the sticky face to a point indicated by the line $a^2$, which draws up the edges of the sheet and forms thereby the cone before referred to, after which the edges B are turned up as before stated.

While for convenience of shipping the sheets are arranged to be sold in blank form it is manifest that the device may be completed before it is put upon the market for sale.

It will be manifestly clear by Fig. 1 that a fly-catcher constructed as therein shown can be set at any point without the danger of soiling the table or other portion on which it may rest. Furthermore it can be taken up in the hand and moved about without the least danger of soiling the hands, as it is in the nature of a raised fly-paper.

I am aware that a fly-catcher having a raised fly-paper is not new, as devices have been made in which the paper is held in a suitably-constructed supporting-frame. My device, however, is formed entirely of the paper proper in the nature of a raised sticky paper, (round or any other shape.)

Having thus described my invention, what I claim, and desire to secure by Letters Patent, is—

1. A fly catching device consisting of a sheet of sticky fly paper bent to the form of a cone and having its lower edges upturned to form a trough.

2. A fly catching paper, formed of a cone-like body, having its entire raised face coated and having its edges projected vertically from the base to form a surrounding rim, all substantially as shown and for the purposes described.

3. As a new article of manufacture, a fly catching device, formed of a sheet coated on its raised upper surface having a central opening and a radial slitted portion, held to overlap and joined to the body portion whereby such body is made conical, said body having its lower edges upturned, all substantially as shown and for the purposes described.

In testimony whereof I affix my signature in presence of two witnesses.

WILLIAM C. JEROME.

Witnesses:
CHARLES E. CHILDS,
F. W. BROWN.